United States Patent
Mallmann (10) Patent No.: US 11,280,390 B2
(45) Date of Patent: Mar. 22, 2022

(54) VEHICLE DEVICE WITH A SPINDLE/NUT ARRANGEMENT AND WITH AN ANTI-ROTATION DEVICE AND METHOD FOR MOUNTING AN ANTI-ROTATION DEVICE FOR THE MANUFACTURE OF SUCH A VEHICLE DEVICE

(71) Applicant: ZF Active Safety GmbH, Koblenz (DE)

(72) Inventor: Markus Mallmann, Pfalzfeld (DE)

(73) Assignee: ZF Active Safety GmbH, Koblenz (DE)

( * ) Notice: Subject to any disclaimer, the term of this patent is extended or adjusted under 35 U.S.C. 154(b) by 151 days.

(21) Appl. No.: 16/535,959

(22) Filed: Aug. 8, 2019

(65) Prior Publication Data

US 2020/0049243 A1 Feb. 13, 2020

(30) Foreign Application Priority Data

Aug. 9, 2018 (DE) .......................... 102018213445.6

(51) Int. Cl.
*F16H 21/44* (2006.01)
*F16H 21/54* (2006.01)
*F16H 25/18* (2006.01)
*F16H 25/24* (2006.01)

(52) U.S. Cl.
CPC ................................ *F16H 25/2454* (2013.01)

(58) Field of Classification Search
CPC ............. F16H 25/2454; F16H 25/2472; F16H 2025/2445
USPC ......................................................... 74/411
See application file for complete search history.

(56) References Cited

U.S. PATENT DOCUMENTS

| | | | | |
|---|---|---|---|---|
| 3,398,598 A | * | 8/1968 | Gress, Jr. ............... | B23Q 5/408 74/89.32 |
| 4,148,235 A | * | 4/1979 | Garth ..................... | B23Q 5/408 74/89.36 |
| 2005/0217367 A1 | | 10/2005 | Atkinson | |
| 2016/0033019 A1 | * | 2/2016 | Aramoto ................ | F16D 65/18 74/424.81 |

(Continued)

FOREIGN PATENT DOCUMENTS

| | | |
|---|---|---|
| DE | 37 38 515 A1 | 5/1989 |
| DE | 101 45 302 A1 | 4/2003 |
| DE | 102 58 598 A1 | 6/2004 |

(Continued)

OTHER PUBLICATIONS

Office Action dated Jun. 24, 2019 for German Patent Application No. 10 2018 213 853.2, (14 pp.), note: pp. 1 and 2 are English language Explanations to Section C. Result of Determination Document.

*Primary Examiner* — Jake Cook
(74) *Attorney, Agent, or Firm* — Crowell & Moring LLP (57) ABSTRACT

A vehicle mechanism with a housing may have a spindle/nut assembly and a rotation lock, where in order to displace a spindle rod of the spindle/nut assembly in the longitudinal direction of the spindle rod, a rotational movement of a spindle nut of the spindle/nut assembly is blocked by the rotation lock. In order to support the spindle nut such that it cannot rotate, and/or to facilitate an assembly of the vehicle mechanism, and/or the rotation lock, the rotation lock may have at least one elastomer element for retaining the rotation lock on the housing.

20 Claims, 7 Drawing Sheets

(56) References Cited

U.S. PATENT DOCUMENTS

2016/0097703 A1   4/2016   Pankratz et al.

FOREIGN PATENT DOCUMENTS

| DE | 10 2010 014 572 A1 | 10/2011 |
| DE | 10 2011 121 765 A1 | 6/2013 |
| EP | 0 412 580 A1 | 2/1991 |
| JP | 2004-028592 | 1/2004 |

\* cited by examiner

VEHICLE DEVICE WITH A SPINDLE/NUT ARRANGEMENT AND WITH AN ANTI-ROTATION DEVICE AND METHOD FOR MOUNTING AN ANTI-ROTATION DEVICE FOR THE MANUFACTURE OF SUCH A VEHICLE DEVICE

RELATED APPLICATIONS

This application claims the benefit and priority of German Patent Application DE 10 2018 213 445.6, filed Aug. 9, 2018, which is incorporated by reference herein in its entirety.

TECHNICAL FIELD

The invention relates to a vehicle mechanism with a housing that has a spindle/nut assembly and a rotation lock, wherein in order to displace a spindle rod of the spindle/nut assembly in the longitudinal direction of the spindle rod, a rotational movement of a spindle nut of the spindle/nut assembly is blocked by means of the rotation lock. The invention also relates to a method for installing a rotation lock in order to produce such a vehicle mechanism.

BACKGROUND

A vehicle mechanism of this type is known from DE 10 2011 121 765 A1. A rotation lock is implemented through the interaction of radial projections on a spindle head with axial grooves on an inner circumferential surface of a hollow cylindrical brake piston. This spindle/nut assembly thus converts a rotational movement of the spindle nut into a translational movement of the spindle. An alternative is specified in which the spindle nut of the spindle/nut assembly can be secured against rotation, and a translational movement of the spindle nut can be obtained through a rotation of the spindle rod. A concrete description of how the spindle nut can be supported such that it cannot rotate, however, cannot be derived from this document.

BRIEF DESCRIPTION OF THE DRAWINGS

Embodiments of the present disclosure shall be explained in greater detail below. Identical reference symbols relate to identical, similar, or functionally similar components or elements herein. In the drawings.

DETAILED DESCRIPTION

The fundamental object of certain embodiments of the present disclosure is to further develop a vehicle mechanism and/or a method of the type described above such that the spindle nut is supported such that it cannot rotate. In particular, installation of the vehicle mechanism and/or the rotation lock should be simplified. This should preferably result in an alternative embodiment.

The following description describes an example of a vehicle mechanism with these advantages. For example, in the depicted embodiment(s), the vehicle mechanism has a housing, a spindle/nut assembly, and a rotation lock. The spindle/nut assembly has a spindle rod and a spindle nut. In particular, the spindle rod is threaded into the spindle nut. As a result, an effective length of the spindle/nut assembly can be varied by rotating and/or displacing the spindle rod in relation to the spindle nut. If the vehicle mechanism is a vehicle brake, this can be used, for example, for transferring a braking force. In order to displace the spindle rod of the spindle/nut assembly in the longitudinal direction of the spindle rod, the spindle nut of the spindle/nut assembly is prevented from rotating by the rotation lock. In particular, the displacement of the spindle rod comprises a linear movement of the spindle rod in the axial direction of a longitudinal axis of the spindle rod. The spindle rod can also rotate about the longitudinal axis of the spindle rod in order to obtain the displacement and/or linear movement. The rotation lock contains at least one elastomer element for retaining the rotation lock on the housing.

It is advantageous that a rotation lock can be obtained for blocking a rotational movement of the spindle nut by means of the at least one elastomer element, wherein the installation of the rotation lock can also be facilitated by the elastic properties of the elastomer element. In particular, the use of at least one elastomer element for obtaining the rotation lock results in cost reductions. In particular, the rotation lock is attached to the housing by means of the at least one elastomer element, such that a rotation of the spindle nut is blocked and/or prevented. The rotation lock is preferably located on, retained on, and/or attached to the housing by means of the at least one elastomer element in order to prevent and/or block a movement of the rotation lock and the spindle nut in relation to the housing.

A blocking of rotation of the spindle nut and/or the rotation lock, in particular in relation to the housing, preferably does not mean that the assembly is entirely rigid. Instead, the rotation lock and/or the spindle nut may rotate slightly about the longitudinal axis of the spindle rod due to the elastic properties of the elastomer element when force is applied thereto. In particular, this slight rotation is limited to only a few degrees, one degree, or less than one degree. The slight rotation preferably stops as soon as the material of the elastomer element is compacted such that a further compression of the material is impossible and/or prevented.

A linear movement is preferably understood to be a translational movement, in particular a translational movement in a straight line. In particular, a rotational movement relates to a rotation about a central axis of the spindle nut and/or the longitudinal axis of the spindle rod.

According to another embodiment, the at least one elastomer element is located in the outer circumference of the rotation lock. As a result, the at least one elastomer element faces the housing and/or an inner wall of the housing. The rotation lock is preferably located in an interior chamber of the housing. The interior chamber can form a hollow cylinder. In particular, the at least one elastomer element is in direct contact with the housing. The at least one elastomer element can therefore bear directly on the inner wall of the housing and/or the interior chamber of the housing, and/or interact therewith. The at least one elastomer element can determine a maximum outer diameter of the rotation lock. In particular, the maximum outer diameter is determined or established exclusively on the basis of the at least one elastomer element or on the basis of numerous elastomer elements. Due to the elastic properties of the elastomer element, the outer diameter of the rotation lock can be reduced, thus facilitating installation of the rotation lock.

In particular, the rotation lock has numerous elastomer elements. The rotation lock preferably has three, four, or more elastomer elements. The numerous elastomer elements can be distributed evenly or uniformly over the outer circumference of the rotation lock. The numerous elastomer elements are preferably located on a common, imaginary, circumferential line. The circumferential line can be coaxial to the center of the rotation lock, the longitudinal axis of the spindle rod, or the central axis of the spindle nut.

According to a further development, the at least one elastomer element is annular, in the shape of a ring, a disk, a circular disk, or in the shape of a circular disk. In particular, the outer circumference of the elastomer element has a corresponding shape. The elastomer element preferably has a circumferential outer contour or a groove on its outer circumference. The elastomer element can be placed in the rotation lock and/or located on the rotation lock with a section of its outer circumference that is specifically transverse, at a right angle, and/or extending in the radial direction, in relation to the longitudinal axis of the rotation lock, the central axis of the spindle nut, and/or the longitudinal axis of the spindle rod. In particular, the elastomer element is made of a rubber material.

According to another embodiment, the at least one elastomer element contains at least one reinforcing component. The reinforcing component can reduce the elastic properties of the elastomer element to a required minimum. In particular, the reinforcing component is located in a central area and/or in a through hole in the elastomer element. The reinforcing component can form a cross brace that is an integral part of the elastomer element. In particular, such a reinforcing component can be made of the same material as the elastomer element. Alternatively, the reinforcing component can be attached to the elastomer element by means of a form fit, or a form fitting connection. The reinforcing component can be in the form a ring that is connected in a form fitting manner to the elastomer element, or an annular disk connected to the elastomer element. The reinforcing component can thus form a separate or independent component. Moreover, the reinforcing component can be made from another, e.g. stiffer, material than the elastomer element in this case. In particular, the reinforcing component has a rigid design.

According to a further development, the rotation lock contains a structural element. The structural element can have a rigid design. In particular, the structural element is made of a metal, a sheet metal, or plastic material, preferably a fiber-reinforced plastic. The structural element has at least one attachment receiver for a form fitting and/or force fitting attachment of the elastomer element. In particular with numerous elastomer elements, the structural element has numerous attachment receivers. In this case, each attachment receiver is dedicated to a single elastomer element. The attachment receiver is preferably located in the outer circumference of the rotation lock and/or the structural element. The attachment receiver can exhibit a circular-segment opening. In particular, the circular-segment opening opens radially outward in relation to the structural element, a longitudinal axis of the rotation lock, a central axis of the spindle nut, and/or a longitudinal axis of the spindle rod. The circular-segment opening thus does not have a closed circumferential rim, but instead has a gap in the rim. The elastomer element can be placed in the attachment receiver through this gap in the circular-segment opening. The attachment receiver and/or the circular-segment opening preferably extends over an outer diameter of the elastomer element placed in the opening. As a result, the elastomer element is sufficiently retained in the attachment receiver. In particular, the gap in the attachment receiver and/or the opening extends radially outward in relation to the longitudinal axis of the rotation lock, the central axis of the spindle nut, and/or the longitudinal axis of the spindle rod.

The attachment receiver preferably has an inner contour forming an annular segment. This annular-segment inner contour interacts with a corresponding annular outer contour of the elastomer element in order to obtain the form fitting attachment of the elastomer element in the attachment receiver. The inner contour and the outer contour preferably have a circumferential groove, or a circumferential web. In this case, the circumferential direction relates to an outer circumference of the elastomer element or an inner circumference of the attachment receiver. The annular-segment inner contour of the attachment receiver can thus contain a web that engages in a circumferential groove in the annular contour of the elastomer element. Alternatively, the outer contour of the elastomer element can have a circumferential web, and the annular-segment inner contour can contain a corresponding groove.

According to a further development, the rotation lock contains a retention element for receiving the spindle nut. The retention element can be in the form of a sleeve. The retention element can also contain or form an inner chamber for receiving the spindle nut. The spindle nut is preferably retained in a form fitting manner in the retention element and/or the interior chamber. The spindle nut can be displaced linearly in the longitudinal direction of the retention element. The retention element and the spindle nut can be connected to one another by means of at least one guide groove and at least one guide web that corresponds to the guide groove. The guide groove and the guide web can extend parallel to the longitudinal axis of the rotation lock, the central axis of the spindle nut, and/or the longitudinal axis of the spindle rod. In particular, the retention element is securely connected to the structural element, such that the retention element is unable to rotate in relation to the structural element. The structural element can contain a through hole. The diameter of the through hole in the structural element can correspond substantially to the inner diameter of the retention element, or the interior chamber of the retention element. In particular, the through hole in the structural element transitions into the interior chamber in the retention element. The through hole of the structural element is preferably located in the center of the structural element.

According to another embodiment, the housing has at least one receiver, in particular numerous receivers, for receiving the, or each of the, individual elastomer elements in a form fitting manner. In the case of numerous elastomer elements, there is preferably one receiver for each individual elastomer element. A section of the elastomer element extending outward over the structural element of the rotation lock is preferably received and/or retained in the receiver. The contour of the receiver preferably corresponds to the section of the elastomer element placed in the receiver. In particular, the receiver is in the form of a recess in the housing. The receiver and/or the recess is preferably formed in the inner wall of the interior chamber of the housing. The recess can be in the form of a circular segment. In particular, the rotation lock is located in the interior chamber of the housing such that sections of the elastomer element interact in a form fitting manner with the receivers, and at the same time an outer circumference of the structural element bears on the inner wall of the interior chamber of the housing.

It is of particular advantage that the vehicle mechanism is designed in the form of a vehicle brake, a braking force generating mechanism, and/or a braking force reinforcement mechanism. Such a vehicle mechanism can be used in a motor vehicle. Moreover, the vehicle mechanism can be in the form of an electro-hydraulic mechanism, or a brake. A brake piston can be actuated or deactivated by means of the spindle/nut assembly. By way of example, when the spindle rod of the spindle/nut assembly is displaced, a readjustment function can be obtained in order to compensate for wear to the brake pads. Alternatively, the spindle/nut assembly can be used to supplement a braking force.

In addition to the vehicle mechanism itself, a method for installing a rotation lock and for producing a vehicle mechanism according to certain embodiment is proposed. According to this method, the rotation lock is inserted into the interior chamber of the housing, until the at least one elastomer element snaps in place in the receiver in the housing, at which point the rotation lock is fully inserted into the housing, and the rotation lock is retained in place in relation to the housing. In particular, a rotational movement of the spindle nut is also blocked as a result. The spindle nut is connected to the rotation lock for this. In particular, the spindle nut is non-rotatably connected to the rotation lock. This non-rotational connection of the spindle nut to the rotation lock can be obtained through a form fitting connection. At the same time, the form fitting connection between the spindle nut and the rotation lock can enable a linear movement of the spindle nut in the longitudinal direction of the longitudinal axis of the rotation lock, the central axis of the spindle nut, and/or the longitudinal axis of the spindle rod.

The at least one elastomer element is preferably compressed during the insertion of the rotation lock into the interior chamber of the housing. Because of the compression of the at least one elastomer element, the outer diameter of the rotation lock can be reduced such that the rotation lock can be installed or inserted in the interior of the housing. In particular, the elastomer element reassumes its initial, uncompressed shape when it is snapped in place in the receiver. As a result, the rotation lock is sufficiently retained in place in the interior chamber of the housing in relation to the housing.

According to a further development, an assembly device is used for inserting the rotation lock into the interior chamber of the housing. In particular, the assembly device forms an assembly aid. The assembly device has a guide ramp for the elastomer element. The guide ramp compresses the elastomer element from its initial uncompressed form to a compressed form in a continuous manner when the rotation lock is inserted into the interior chamber of the housing. Because the elastomer element, and/or numerous elastomer elements, are compressed, the outer diameter of the rotation lock is reduced to the point that the rotation lock can be inserted into the interior chamber of the housing.

The assembly device can be in the form of a sleeve. The guide ramp is formed by a conical and/or funnel-shaped design of an inner wall of the assembly device. The assembly device is preferably placed on an opening in the housing. In particular, a distal inner diameter of the assembly device facing away from the housing transitions into a proximal inner diameter of the assembly device that boarders on the housing that is smaller than the distal inner diameter. In particular, the proximal inner diameter of the assembly device corresponds to the inner diameter of the interior chamber of the housing and/or the opening in the housing. The distal inner diameter preferably corresponds to at least the outer diameter of the rotation lock when the elastomer element(s) are not compressed. After the rotation lock is placed in the interior chamber of the housing, the assembly device can be removed from the housing. As a result, the assembly device can be reused as an assembly tool.

According to a further development, a reinforcing component is inserted into a through hole in the elastomer element after the rotation lock has been inserted into the interior chamber of the housing. As a result, the rotation lock can first be inserted or placed in the interior chamber of the housing without the reinforcing component. Consequently, the elastomer element can be deformed particularly easily, thus facilitating the assembly. The reinforcing component is first placed in the elastomer element after the rotation lock has reached its final position in the interior chamber of the housing. As a result, the rigidity of the elastomer element is increased, and the risk of an unintended displacement of the rotation lock in the interior chamber of the housing is significantly reduced.

In particular, the vehicle mechanism produced in accordance with the method according to certain embodiment is a vehicle mechanism according to certain embodiment, described above. The method is preferably refined in accordance with all of the designs explained in conjunction with the vehicle mechanism according to certain embodiment described herein. Furthermore, the vehicle mechanism described herein can be refined in accordance with all of the designs explained in conjunction with the method.

Figure 1:
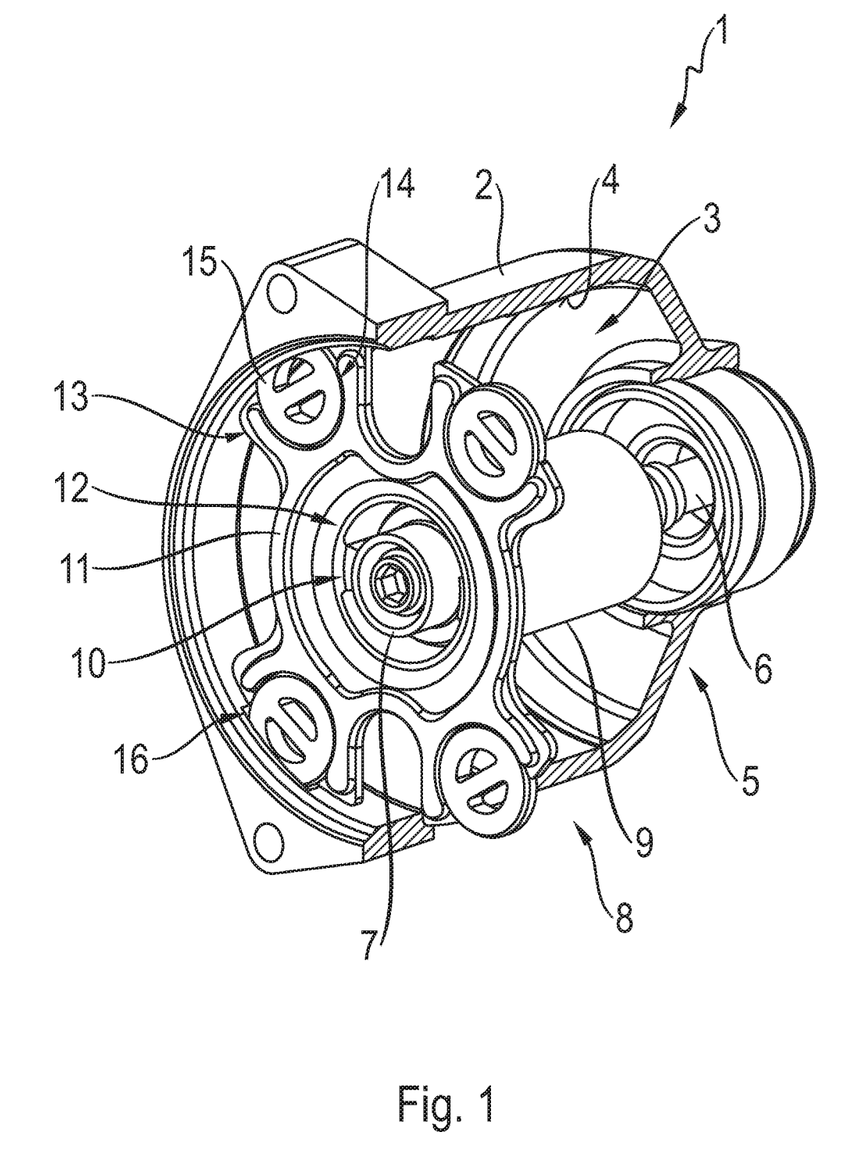
FIG. 1 shows a partially cutaway perspective view of a first vehicle mechanism according to the present disclosure.

Now referring to the drawings, FIG. 1 shows a partially cutaway perspective view of a first vehicle mechanism 1 according to certain embodiment. The vehicle mechanism 1 is in the form of a vehicle brake in this exemplary embodiment, wherein only a part of the entire vehicle mechanism 1 is shown herein.

The vehicle mechanism 1 has a housing 2. The housing 2 has an interior chamber 3 that has an inner wall. The interior chamber 3 in this exemplary embodiment is substantially in the form of a hollow cylinder. Accordingly, the inner wall 4 has a circular cross section.

The vehicle mechanism 1 also has a spindle/nut assembly 5 (sometimes referred to as a "spindle and nut assembly"). The spindle/nut assembly 5 is located in the interior chamber 3 of the housing. The spindle/nut assembly 5 contains a spindle rod 6 and a spindle nut 7. The spindle nut 7 interacts by means of an internal thread with a corresponding external thread on the spindle rod 6.

The vehicle mechanism 1 also has a rotation lock 8. The rotation lock 8 is located in the interior chamber 3 of the housing. The rotation lock 8 has a retention element 9. The retention element 9 is in the form of a sleeve in this exemplary embodiment. Because the retention element 9 is in the form of a sleeve, the retention element 9 has an interior chamber 10. The retention element 9, or the interior chamber 10 is coaxial to the longitudinal axis of the spindle rod 6. Moreover, the spindle nut 7 is received in the retention element 9, or the interior chamber 10. The spindle nut 7 is non-rotatably connected to the retention element 9.

Furthermore, the rotation lock 8 has a structural element 11. The structural element 11 has a central through hole 12. The inner diameter of the through hole 12 corresponds substantially to the inner diameter of the internal chamber 10 of the retention element 9. The retention element 9 is attached to the structural element 11. The through hole 12 transitions into the interior chamber 10. The attachment between the retention element 9 and the structural element 11 is such that no relative movement is possible between the retention element 9 and the structural element 11.

The structural element 11 has numerous attachment receivers 13 on the outer circumference of the structural element 11. There are four attachment receivers 13 in this exemplary embodiment. For a better overview, not all of the attachment receivers 13 are provided with a reference symbol. Moreover, the structural element 11 is mirror symmetrical to a plane in the longitudinal direction of the spindle rod 6 in this exemplary embodiment, resulting in a uniform distribution of the attachment receivers 13. Alternatively, the attachment receivers 13 can be evenly distributed on the outer circumference of the structural element 11. The attachment receivers 13 each have an opening 14 forming of a circle segment. The opening 14 opens radially outward in relation to the structural element 11 or the longitudinal axis of the spindle rod 6. The attachment receiver 13 extends beyond an outer diameter of an elastomer element 15 placed in the opening 14. In this regard, the attachment receiver 13, or the opening 14 is substantially C-shaped. A single elastomer element 15 is placed in each attachment receiver 13. For a better overview, not all of the elastomer elements 15 are provided with a reference symbol.

The inner wall 4 of the interior chamber 3 of the housing has receivers 16. The receivers 16 are designed to receive a section of an elastomer element 16 in a form fitting manner. A section of the elastomer element 15 that extends radially outward over the structural element 11 is received in the respective receiver 16. As a result, the rotation lock 8 is retained in place on the housing 2, such that a rotational movement of the spindle nut 7 is blocked. For a better overview, not all of the receivers 16 are provided with a reference symbol.

Moreover, an outer circumference of the structural element 11 bears on the inner wall 4 of the interior chamber 3 of the housing.

Figure 2:
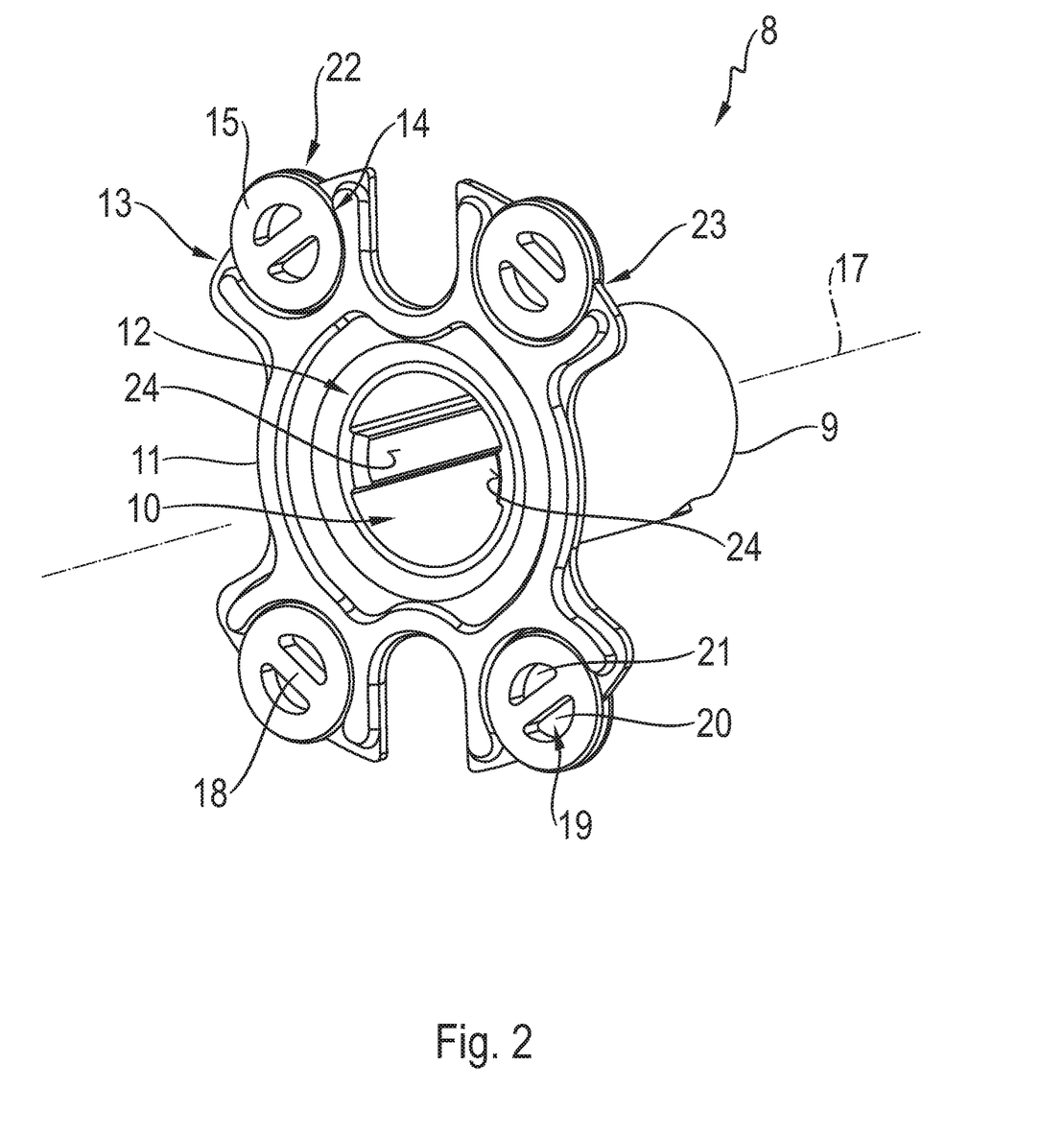
FIG. 2 shows a perspective view of a first rotation lock for the first vehicle mechanism according to the present disclosure shown in FIG. 1.

FIG. 2 shows a perspective view of a first rotation lock, specifically the rotation lock 8, for the first vehicle mechanism 1 according to certain embodiment shown in FIG. 1. The elastomer elements 15 are located in the outer circumference of the rotation lock 8. The elastomer elements 15 determine or define a maximum outer diameter of the rotation lock 8. The structural element 11 itself has a smaller outer diameter than the rotation lock 8 with the elastomer elements 15. In other words, sections of the elastomer elements 15 extend outward over the structural element 15. This results in the radial alignment in relation to a longitudinal axis 17 of the rotation lock 8. In the assembled state shown in FIG. 1, the longitudinal axis 17 of the rotation lock 8 coincides with a longitudinal axis of the spindle rod 6 and a central axis of the spindle nut 7. The retention element 9 is coaxial to the longitudinal axis 17.

The structural element 11 in this exemplary embodiment substantially forms a plate or disk. The structural element 11 in this exemplary embodiment is at a right angle to the longitudinal axis 17. The center of the elastomer element 15, or the radially outermost points of the elastomer elements 15 in relation to the longitudinal axis 17 are each located on a common circle, the center of which lies in the longitudinal axis 17.

The elastomer elements 15 in this exemplary embodiment each have an annular form. Moreover, the elastomer elements 15 each have a reinforcing component 18. Because of the fundamentally annular basic structure of the elastomer elements 15, they each form a central through hole 19. In this exemplary embodiment, the reinforcing component 18 forms a cross brace that extends transversely through the through hole 19 such that the through hole 19 is divided into two subsidiary holes 20, 21. In this exemplary embodiment, the elastomer element 15 forms an integral component with the reinforcing component 18, both of which are made of the same material. The reinforcing components 18 in the form of cross braces extend substantially in the circumferential direction along the outer circumference of the structural element 11.

The elastomer elements 15 have an annular outer contour 22 on their outer circumference. In this exemplary embodiment, the outer contour 22 forms a circumferential groove. The attachment receiver 13 has a corresponding inner contour 23. In this exemplary embodiment, the inner contour 23 thus forms a web in the form of an annular segment.

To install the elastomer elements 15, they are first inserted or snapped in place into the attachment receivers 13 with their outer circumference, or the outer contour 22, pushed radially inward in relation to the longitudinal axis 17.

The retention element 9 has two opposing guide webs 24 in the interior chamber 10 in this exemplary embodiment. The guide webs 24 are parallel to the longitudinal axis 17. The guide webs 24 interact with corresponding guide grooves in the spindle nut 7 shown in FIG. 1 to form a form fitting connection. Because of the interaction of the guide webs 24 and the guide grooves of the spindle nut 7, the spindle nut 7 is located in the retention element 9 shown in FIG. 1 such that it cannot rotate. At the same time, the spindle nut 7 can move linearly along the longitudinal direction of the longitudinal axis 17 in this exemplary embodiment. Alternatively, the spindle nut 7 can be placed and secured in the retention element 9 such that the spindle nut 7 is also connected to the retention element 9 such that it is held in place longitudinally along the longitudinal axis 17.

Figure 3:
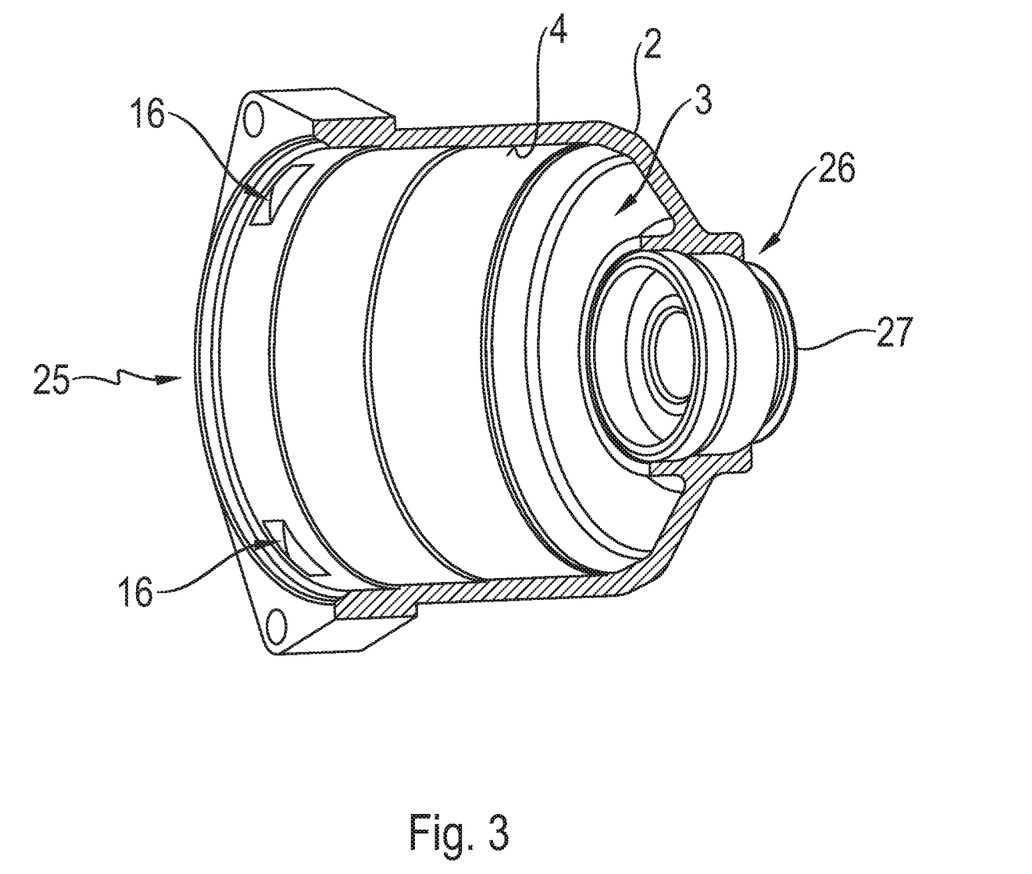
FIG. 3 shows a partially cutaway perspective view of a housing for the first vehicle mechanism according to the present disclosure shown in FIG. 1.

FIG. 3 shows a partially cutaway perspective view of the housing 2 for the first vehicle mechanism 1 according to certain embodiment shown in FIG. 1. The housing 2 has a housing opening 25, through which the rotation lock 8 shown in FIG. 2 can be inserted into the interior chamber 3 of the housing.

The receivers 16 located in the inner wall 4 of the interior chamber 3 of the housing for receiving the elastomer elements 15 of the rotation lock 8 shown in FIGS. 1 and 2 form recesses in the inner wall 4 in this exemplary embodiment. The receivers 16 correspond to the sections of the elastomer elements 15 projecting over the structural element 11 shown in FIG. 2. As a result, a sufficient form fitting connection can be obtained between the housing 2 and the rotation lock 8, such that the rotation lock 8, and thus the spindle nut 7, shown in FIG. 1 are non-rotatably connected to the housing 2. Furthermore, the rotation lock 8 shown in FIGS. 1 and 2 can be located in the interior chamber 3 of the housing such that a further linear movement of the rotation lock 8 is prevented by the receivers 16. The rotation lock 8 shown in FIG. 2 can thus be held in place by means of the receivers 16 in relation to the housing 2. In other words, when the rotation lock 8 is placed in the housing 2 as shown in FIG. 1, any relative movement of the rotation lock 8 in relation to the housing 2 is blocked. At most, when force is applied thereto, the rotation lock 8 can rotate slightly in the circumferential direction, due to the elastic properties of the elastomer elements 15.

With this exemplary embodiment, the housing 2 has an piston hole 26 in a side lying opposite the housing opening 25. There is a piston 27 in the piston hole 26. The piston 27 is a cylindrical piston in this case, and can slide in the piston hole 26.

Figure 4:
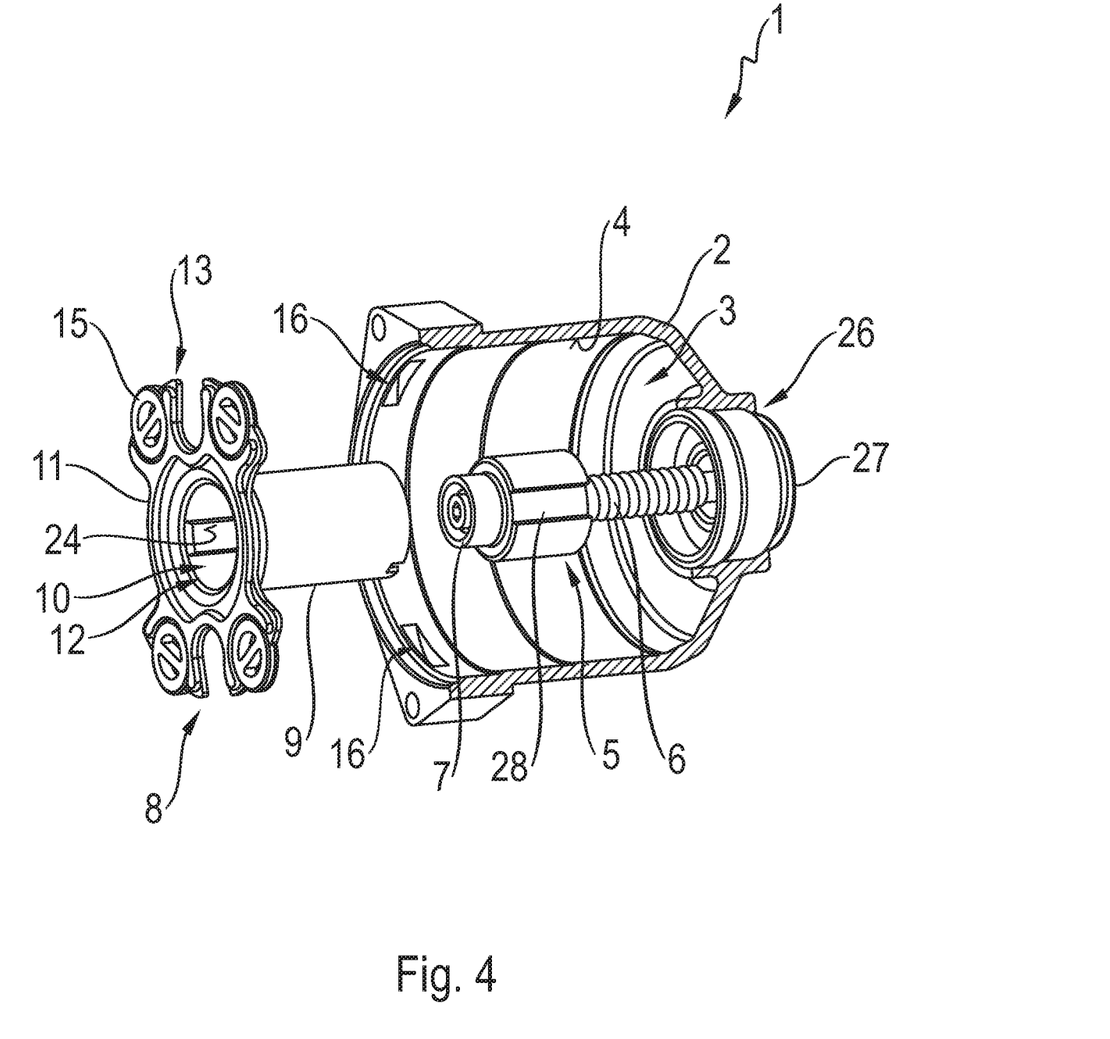
FIG. 4 shows a partially cutaway perspective view of the first vehicle mechanism according to the present disclosure, prior to installation of the first rotation lock shown in FIG. 2.

FIG. 4 shows a partially cutaway perspective view of the first vehicle mechanism 1 according to certain embodiment prior to installing the first rotation lock 8 shown in FIG. 2. The guide groove 28 on the spindle nut 7 that interacts with a guide web 24 on the retention element 9, or the rotation lock 8, respectively, can be readily seen therein.

Furthermore, the spindle nut 7 in this exemplary embodiment is located on an end of the spindle rod 6 facing away from the piston 27. An end of the spindle rod 6 facing away from the spindle nut 7 is attached to the piston 27. As a result, the piston 27 can be moved by the spindle rod 6 in the longitudinal direction of the spindle rod 6.

In order to install the rotation lock 8 in the interior chamber 3 of the housing, the rotation lock 8 is first inserted with the retention element 9 into the interior chamber 3 of the housing. The spindle/nut assembly 5 is already located in the interior chamber 3 of the housing for this. When the rotation lock 8 is inserted into the interior chamber 3 of the housing, the retention element 9 is slid over the spindle nut 7, wherein the guide webs 24 of the retention element 9 interact with the guide grooves 28 of the spindle nut 7 in this exemplary embodiment. The insertion or installation of the rotation lock 8 is completed as soon as the elastomer elements 15 lock or snap in place in the receivers 16.

Figure 5:
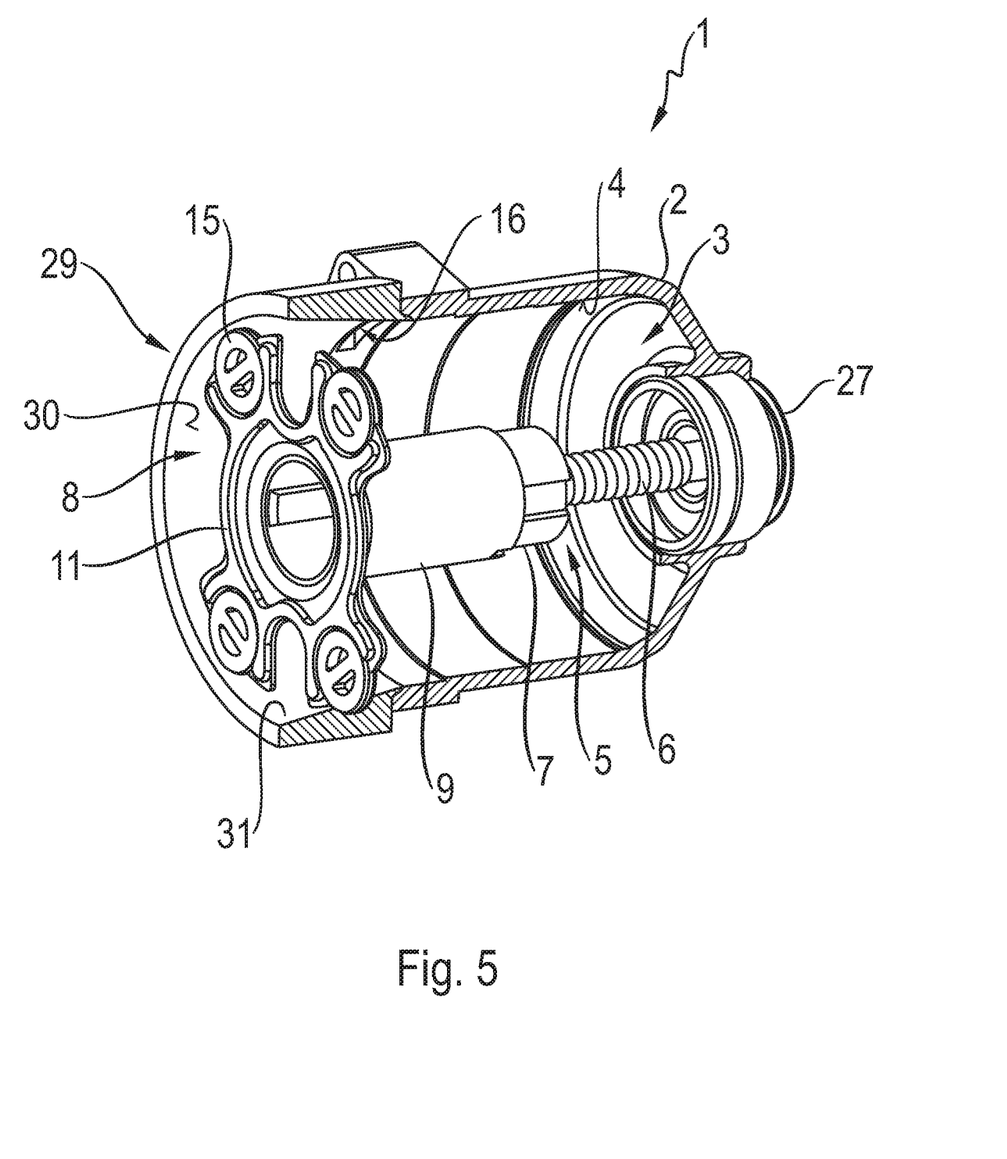
FIG. 5 shows a partially cutaway perspective view of the first vehicle mechanism according to the present disclosure, with an assembly device for installing the first rotation lock shown in FIG. 2.

FIG. 5 shows a partially cutaway perspective view of the first vehicle mechanism 1 according to certain embodiment, with an assembly device 29 for installing the first rotation lock 8 shown in FIG. 2. The assembly device 29 is placed on the housing opening 25 of the housing 3 shown in FIG. 3. The assembly device 29 has a guide ramp 30. The guide ramp 30 is used to guide or insert the rotation lock 8 into the interior chamber 3 of the housing.

In this exemplary embodiment, the assembly device 29 is in the form of a sleeve. Moreover, the guide ramp 30 in this example forms an inner wall 31 of the assembly device 29 with its conical or funnel-shaped design. When installing or inserting the rotation lock 8 by means of the assembly device 29, the elastomer elements 15 bear on the guide ramp 30. The elastomer elements 15 are continuously compressed, from their uncompressed starting shape to a compressed shape, by the guide ramp during the insertion of the rotation lock 8 into the interior chamber 3 of the housing. As a result, the outer diameter of the rotation lock 8 is reduced, facilitating the insertion of the rotation lock 8 into the interior chamber 3 of the housing.

For this, an distal inner diameter of the assembly device 29 transitions to an smaller proximal inner diameter of the assembly device 29 bordering on the housing 2 or the housing opening 25, which is smaller than the distal inner diameter. In this exemplary embodiment, the proximal inner diameter of the assembly device 29 corresponds to the inner diameter of the interior chamber 3 of the housing. The rotation lock 8 is thus inserted into the interior chamber 3 of the housing until the elastomer elements 15 lock in place in the receivers 16.

The inner diameter of the interior chamber 3 of the housing is this smaller with regard to its inner wall 4 than the outer diameter of the rotation lock 8 when the elastomer elements are not compressed. The outer diameter of the structural element 11 can correspond substantially to the inner diameter of the interior chamber 3 of the housing.

After installing the rotation lock 8, the assembly device 29 can be removed, and re-used as an assembly tool.

Figure 6:
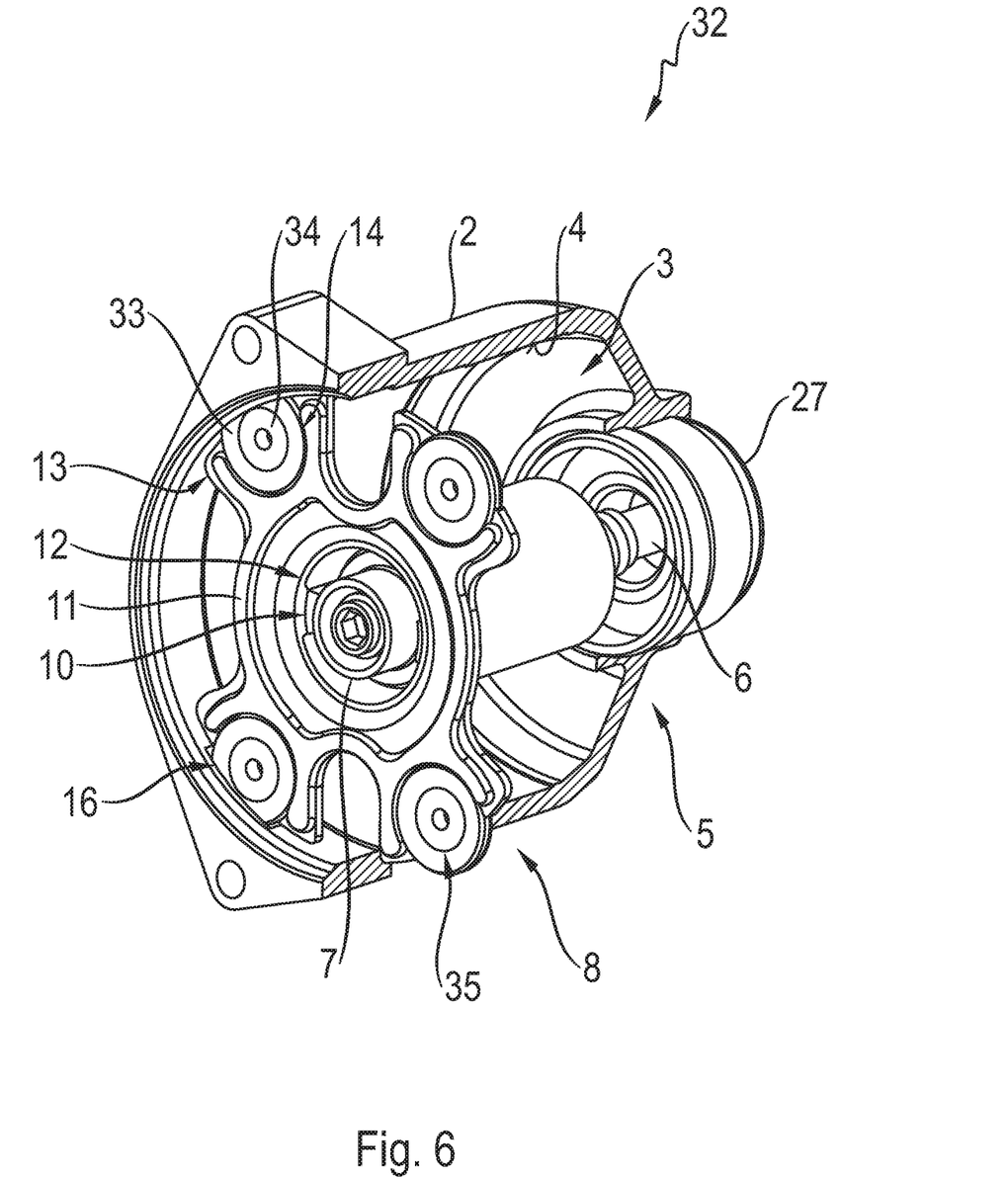
FIG. 6 shows a partially cutaway view of another vehicle mechanism according to the present disclosure.

FIG. 6 shows a partially cutaway perspective view of another vehicle device 32 according to certain embodiment. The vehicle device 32 substantially corresponds to the vehicle device 1. Identical features have the same reference symbols as above. In this regard, reference is made to the preceding description.

In differing from the vehicle device 1, the vehicle device 32 illustrated herein contains elastomer elements 33 instead of the elastomer elements 15. The elastomer elements 33 are annular. Instead of the reinforcing component 18, there is another reinforcing component 34. In this exemplary embodiment, the reinforcing component 34 is annular. Moreover, the reinforcing component 34 is made of a different material than the elastomer element 33. The material for the reinforcement element 34 is selected here such that the rigidity of this material is greater than that of the material of the elastomer elements 33. In particular, the reinforcing component 34 is stiff, or rigid.

The reinforcing component 34 is connected in a form fitting manner to the elastomer element 33. For this, the reinforcing component 34 is placed in a through hole 35 in the elastomer element 33.

Figure 7:
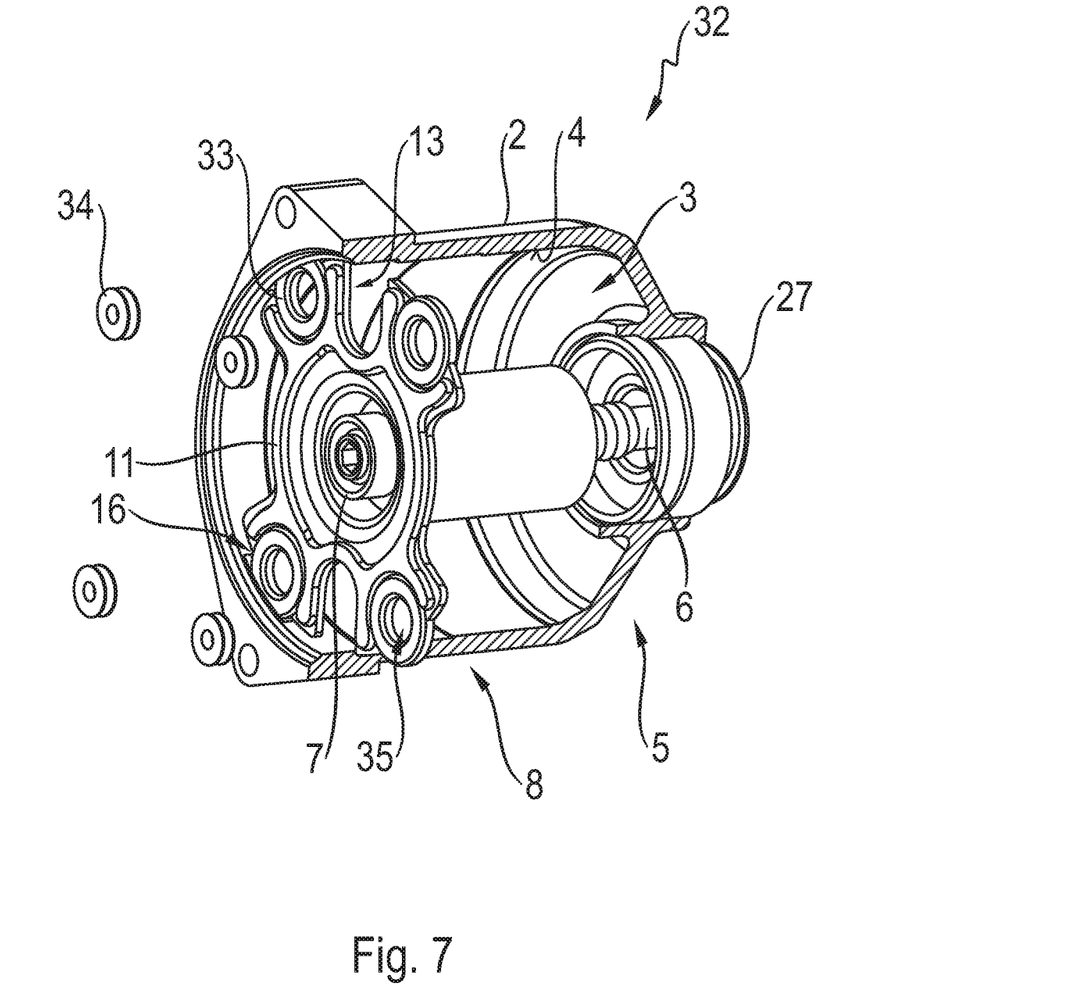
FIG. 7 shows a partially cutaway perspective view of the other vehicle mechanism according to the present disclosure, prior to installing reinforcing components.

FIG. 7 shows a partially cutaway perspective view of the other vehicle mechanism 32 according to certain embodiment, prior to installing the reinforcing component 34. The rotation lock 8 of the vehicle mechanism 32 is thus first placed in the interior chamber 3 of the housing without the reinforcing component 34. This can take place with or without the assembly device 29 shown in FIG. 5. Because the reinforcing component 34 is left out, the elastomer elements 33 can be readily or easily deformed. As a result, the installation of the rotation lock 8 is further facilitated. The reinforcing components 34 are first placed or installed in the through holes 35 in the elastomer elements 33 after the elastomer elements are locked or snapped in place in the receivers 15. As a result, the rigidity of the elastomer elements 33 is increased. Consequently, an undesired releasing of the rotation lock 8, or a slipping of the elastomer elements 33 out of the receivers 16 is reliably prevented.

REFERENCE SYMBOLS 1 vehicle mechanism
2 housing
3 interior chamber of the housing
4 inner wall
5 spindle/nut assembly
6 spindle rod
7 spindle nut
8 rotation lock
9 retention element
10 inner chamber
11 structural element
12 through hole
13 attachment receiver
14 opening
15 elastomer element
16 receiver
17 longitudinal axis 18 reinforcing component
19 through hole
20 partial hole
21 partial hole
22 outer contour
23 inner contour
24 guide web
25 housing opening
26 piston hole
27 piston
28 guide groove
29 assembly device
30 guide ramp
31 inner wall
32 vehicle mechanism
33 elastomer element
34 reinforcing component
35 through hole

I claim:

1. A vehicle mechanism, comprising:
a housing;
a spindle nut assembly, the spindle nut assembly having a spindle rod and a spindle nut, wherein rotation of the spindle nut relative to the spindle rod causes relative movement between the spindle nut and the spindle rod in a longitudinal direction of the spindle rod; and
a rotation lock,
wherein the rotation lock is configured to engage the spindle nut to prevent rotation of the spindle nut relative to the rotation lock, and
wherein the rotation lock has at least one elastomer element for securing the rotation lock to the housing,
wherein the at least one elastomer element is located on an outer perimeter of the rotation lock.

2. The vehicle mechanism according to claim 1, wherein the outer perimeter of the rotation lock is an outer circumference.

3. The vehicle mechanism according to claim 1, wherein the at least one elastomer element is in direct contact with the housing such that the at least one elastomer element determines a maximum outer diameter of the rotation lock.

4. The vehicle mechanism according to claim 1, wherein the rotation lock has a plurality of elastomer elements, and wherein each elastomer element of the plurality of elastomer elements is uniformly distributed on an outer circumference of the rotation lock.

5. The vehicle mechanism according to claim 1, wherein the at least one elastomer element has a circumferential outer contour.

6. The vehicle mechanism according to claim 1, wherein the at least one elastomer element has a reinforcing component, and wherein the reinforcing component is formed as an annular component connected in a form fitting manner to a body of the elastomer element.

7. The vehicle mechanism according to claim 1, wherein the rotation lock has a structural element, wherein the structural element has at least one attachment receiver for a form fitting attachment of the elastomer element.

8. The vehicle mechanism according to claim 7, wherein the attachment receiver has an opening with a circular segment, wherein the opening opens radially outward in relation to the structural element, and the attachment receiver extends over an outer diameter of the at least one elastomer element when the at least one elastomer element is placed in the opening.

9. The vehicle mechanism according to claim 8, wherein the attachment receiver has an inner contour with an annular segment that corresponds with an annular outer contour of the elastomer element in order to obtain the form fitting attachment of the elastomer element in the attachment receiver, and wherein the inner contour and the outer contour have a circumferential groove and a circumferential web, respectively.

10. The vehicle mechanism according to claim 1, wherein the rotation lock has a retention element for receiving the spindle nut.

11. The vehicle mechanism according to claim 10, wherein the retention element is includes a sleeve, wherein the sleeve has an inner chamber for receiving the spindle nut, and wherein the spindle nut is retained in a form fitting manner within the inner chamber.

12. The vehicle mechanism according to claim 10, wherein the retention element is includes a sleeve, wherein the sleeve has an inner chamber for receiving the spindle nut, and wherein the spindle nut is displaceable within the inner chamber.

13. The vehicle mechanism according to claim 1, wherein the housing has at least one receiver for receiving the at least one elastomer element in a form fitting manner, and wherein a section of the at least one elastomer element that extends outward over a structural element of the rotation lock is received in the receiver.

14. The vehicle mechanism according to claim 1, wherein the vehicle mechanism is integrated within at least one of a vehicle brake, a braking force generating mechanism, and a braking force reinforcing mechanism.

15. A method, comprising:
assembling a vehicle mechanism, the vehicle mechanism, comprising:
a housing;
a spindle nut assembly, the spindle nut assembly having a spindle rod and a spindle nut, wherein rotation of the spindle nut relative to the spindle rod causes relative movement between the spindle nut and the spindle rod in a longitudinal direction of the spindle rod; and
a rotation lock,
wherein the rotation lock is configured to engage the spindle nut to prevent rotation of the spindle nut relative to the rotation lock,
wherein the rotation lock has at least one elastomer element for securing the rotation lock to the housing, and
wherein the rotation lock is inserted into an interior chamber of the housing of the housing until the at least one elastomer element snaps in place in a receiver in the housing.

16. The method according to claim 15, wherein the at least one elastomer element is compressed during the insertion of the rotation lock, and wherein the elastomer element assumes its uncompressed initial shape once it is snapped into place.

17. The method according to claim 15, wherein an assembly device is used to insert the rotation lock into the interior chamber of the housing, wherein the assembly device has a guide ramp for the elastomer element, and wherein the at least one elastomer element is continuously compressed from its uncompressed initial form to a compressed form by the guide ramp while the rotation lock is inserted into the interior chamber of the housing.

18. The method according to claim 17, wherein the assembly device includes a sleeve, wherein the guide ramp is obtained with a shaped inner wall of the assembly device.

19. The method according to claim 15, wherein a reinforcing component is placed in a through hole in the elastomer element after inserting the rotation lock into the interior chamber of the housing.

20. A vehicle mechanism, comprising:
a housing;
a spindle nut assembly, the spindle nut assembly having a spindle rod and a spindle nut, wherein rotation of the spindle nut relative to the spindle rod causes relative movement between the spindle nut and the spindle rod in a longitudinal direction of the spindle rod; and
a rotation lock,
wherein the rotation lock is configured to engage the spindle nut to prevent rotation of the spindle nut relative to the rotation lock, and
wherein the rotation lock has at least one elastomer element for securing the rotation lock to the housing,
wherein the at least one elastomer element has a reinforcing component, and wherein the reinforcing component is formed as an integral cross brace in the elastomer element.

* * * * *